United States Patent
Xia et al.

(10) Patent No.: US 12,146,953 B2
(45) Date of Patent: Nov. 19, 2024

(54) ACOUSTIC SIGNALS AND DATA PROCESSING SYSTEM AND METHOD FOR SCANNING ACOUSTIC MICROSCOPY

(71) Applicant: X-Wave Innovations, Inc., Gaithersburg, MD (US)

(72) Inventors: Lang Xia, Gaithersburg, MD (US); Dan Xiang, Gaithersburg, MD (US)

(73) Assignee: X-Wave Innovations, Inc., Gaithersburg, MD (US)

( * ) Notice: Subject to any disclaimer, the term of this patent is extended or adjusted under 35 U.S.C. 154(b) by 178 days.

(21) Appl. No.: 17/459,292

(22) Filed: Aug. 27, 2021

(65) Prior Publication Data
US 2023/0066202 A1 Mar. 2, 2023

(51) Int. Cl.
| | |
|---|---|
| *G01S 15/89* | (2006.01) |
| *G01N 29/46* | (2006.01) |
| *G06T 5/10* | (2006.01) |
| *G06T 5/20* | (2006.01) |
| *G06T 5/70* | (2024.01) |

(52) U.S. Cl.
CPC ......... *G01S 15/8977* (2013.01); *G01N 29/46* (2013.01); *G06T 5/10* (2013.01); *G06T 5/20* (2013.01); *G06T 5/70* (2024.01); *G06T 2207/10056* (2013.01); *G06T 2207/10132* (2013.01); *G06T 2207/20182* (2013.01)

(58) Field of Classification Search
None
See application file for complete search history.

(56) References Cited

U.S. PATENT DOCUMENTS

| | | | |
|---|---|---|---|
| 5,922,961 A | 7/1999 | Hsu et al. | |
| 6,890,302 B2 * | 5/2005 | Oravecz | G01N 29/4454 73/620 |

FOREIGN PATENT DOCUMENTS

| | | | | |
|---|---|---|---|---|
| WO | WO-0239085 A2 * | 5/2002 | ......... | G01N 29/0609 |

OTHER PUBLICATIONS

Gubernatis, J.E., et al., "Formal aspects of the theory of the scattering of ultrasound by flaws in elastic materials," J. of Applied Physics 48, 2804 (1977).

(Continued)

*Primary Examiner* — Hovhannes Baghdasaryan
*Assistant Examiner* — Vikas Atmakuri
(74) *Attorney, Agent, or Firm* — Sheets Law PLLC; Kendal M. Sheets (57) ABSTRACT

Some embodiments relate to the application of a system and a signal processing method for data acquired from a Scanning Acoustic Microscope (SAM) to obtain a high axial resolution and enhanced imaging. The SAM is one of ultrasound imaging methods used for NDE. Embodiments may provide methods for decreasing or reducing the duration (width) of the pulses scattered/reflected by multiple objects/scatters. Such embodiments can accomplish this by eliminating, or at least partially eliminating, the background noise by deconvolving the system responses (i.e., reference signals) obtained from either theoretical modeling or experimental acquiring. In one embodiment, the method minimizes the pulse duration by using a regression technique to predict the spectra responses outside a frequency band.

6 Claims, 6 Drawing Sheets

(56) References Cited

OTHER PUBLICATIONS

Honarvar, F., et al., "Improving the time-resolution and signal-to-noise ratio of ultrasonic NDE signals," Ultrasonics 41 (2004) 755-763.
Hanumantharaju, M.C., et al., "Adaptive Color Image Enhancement based Geometric Mean Filter," ICCCS'11, Feb. 12-14, 2011, Rourkela, Odisha, India (2011).
Briggs, A., et al., "Acoustic Microscopy," Oxford University Press, 2d ed., 22-24 (2010).
Xiang, D., Hsu, N. N., & Blessing, G. V. (1996). Materials characterization by a time-resolved and polarization-sensitive ultrasonic technique. In Review of Progress in Quantitative Nondestructive Evaluation (pp. 1431-1438). Springer, Boston, MA.

* cited by examiner

ACOUSTIC SIGNALS AND DATA PROCESSING SYSTEM AND METHOD FOR SCANNING ACOUSTIC MICROSCOPY

This Invention was made with U.S. Government support under Contract No. FA8650-17-C-5063, awarded by the U.S. Department of the Air Force. The Government has certain rights in this invention.

FIELD OF INVENTION

The present embodiments are in the technical field of ultrasound imaging, material characterization, and non-destructive evaluation (NDE). Some embodiments relate to the application of a system and a signal processing method for data acquired from a Scanning Acoustic Microscope (SAM) to obtain a high axial resolution and enhanced imaging. The SAM is one of ultrasound imaging methods used for NDE.

BACKGROUND

A Scanning Acoustic Microscope (SAM) is a nondestructive and quantitative tool used in academia, industry, and many other areas to image the microstructures and evaluate the mechanical properties of materials, as well as to inspect flaws/defects of materials passively, without causing damage to them. One of the advantages of a SAM is its ability to image the surface or/and inside of a material without permanently altering the structure and physical properties of the material under test.

Ultrasonic (also known as acoustic) signals used in scanning acoustic microscopy are often difficult to interpret due to their low signal-to-noise ratio (SNR) or overlapping echoes. The application of high-frequency ultrasonic transducers usually yields low signal to noise ratios. Further, the application of low-frequency transducers suffers from low axial resolutions. In particular, the backscattering/reflection signals from closely-packed flaws/defects or scatters may not be distinguishable or interpreted from raw A-scan signals. In such scenarios, the axial resolution is not enough to differentiate the scattering responses from, for example, two close neighbors of scatters due to the overlap or interference of the ultrasonic pulses. In ultrasound imaging, it is common to employ post-processing techniques for the A-scan ultrasonic/acoustic signals in order to enhance the quality of the reconstructed B-scan and C-scan images.

For closely-packed random scatters such as grains in a metal, the received ultrasonic A-scan signal exhibits great similarities to the background noises. Conventional denoising schemes, such as a spectral subtraction technique, are insufficient in processing such signals because the signal itself is at the noise level. As a result, no clear B-scan or C-scan images can be obtained from such A-scan signals with current signal processing methods.

SUMMARY

In one aspect, a method for processing acoustic signals from an ultrasonic imaging system can include receiving input signal data comprising acoustic data from a scanning device, processing the input signal data in a time domain using ringing window extraction; processing the input signal data in the time domain using beam correction; transforming the input signal data into a frequency domain using Fast Fourier transforms; removing background noise from the transformed input signal data; transforming the input signal data into a time domain using inverse Fast Fourier transforms; converting the transformed input signal data into an acoustic image; and enhancing the acoustic image using Hilbert transforms. In another aspect, the method for processing acoustic signals can include removing background noise by processing the input signal data using Wiener transforms. In other aspects, the method for processing acoustic signals can include removing background noise by processing the input signal data using autoregressive spectral extrapolation.

In another aspect, a method for improving axial resolution and reducing background noises of A-scan (time series) acoustic signals obtained from ultrasonic evaluation and imaging systems can include removing a system response using beam correction of an acoustic signal to process a synthetic or experimental wave field in a host media and calculating a ringing window extraction to process spatial variations of time domain signals; reducing background noise by a conversion of the acoustic signal into frequency domain signals; deconvolving the frequency domain signal with a noise model; increasing an axial resolution of the frequency domain signal comprising extrapolating the frequency domain acoustic signal with an adaptive autoregressive algorithm; transforming the frequency domain acoustic signal into a time domain acoustic signal; creating a reconstructed image using the time domain acoustic signal; and enhancing the time domain acoustic signal and corresponding reconstructed image by applying envelope extraction algorithms to the time domain acoustic signal and subsequently employing geometric mean filters to the time domain acoustic signal. In another aspect, the method can further include calculating the wave field in the host media as:

$$U_I(x, z, \omega) = -\frac{\rho_f c_f}{\rho_0 c_L} T_{fs} \exp\left[i\omega\left(\frac{z_f}{c_f} + \frac{z}{c_L}\right)\right] C_T$$

wherein:
$U_I$ is the amplitude of the wave field in a sample;
$\rho_f$ is a density of the fluid;
$z_f$ is a water path;
$c_f$ is sound speed in water;
$T_{fs}$ is a transmission coefficient from fluid to solid; and
$C_T$ is a diffraction correction for the transmitter.

In yet another aspect, the method can include calculating the ringing window comprises:

$$L_R = L_S - L_F$$

wherein:
$L_R$ is a length of the ringing window;
$L_S$ is a length of a scattering window; and
$L_F$ is a length of a front wall window.

In an additional aspect, the method can include extrapolating the frequency domain acoustic signal comprises calculating an averaged extrapolation as:

$$\bar{X} = \frac{1}{n}\sum_{i=1}^{n} \bar{X}_i$$

wherein:
$\hat{X}$ is a mean extrapolated spectrum; and
$\bar{X}_i$ is an extrapolated spectrum with being windowed by s(i) dB drop.

In an aspect, the acoustic signal is a pulse or a mixture of multiple pulses. In another aspect, the method can include increasing axial resolution in the frequency domain using a regression method. In yet another aspect, the method can include enhancing signals in the time domain using a combination of envelope extraction and geometric mean filtering. In a further aspect, the method can include enhancing the time domain acoustic signal and corresponding reconstructed image by processing the acoustic signal using one of a beam correction, ringing window extraction, Wiener transform, adaptive autoregressive spectra extrapolation, Hilbert transform, and geometric mean filter. In other aspects, the method can include increasing an axial resolution of the frequency domain signal by processing the acoustic signal with a linear time-invariant (LTI) filter.

In an additional aspect, an ultrasound imaging system can include improving axial resolution and reducing background noises. In another aspect, a computer program product can include a non-transitory computer program with computer-executable software means configured to execute the methods described herein.

BRIEF DESCRIPTION OF THE DRAWINGS

The present embodiments are better understood by reference to the following detailed description when considered in connection with the accompanying drawing, wherein.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. The present disclosure is to be considered as an exemplification of the invention and is not intended to limit the invention to the specific embodiments illustrated by the figures or description herein.

Novel acoustic signal processing methods, systems, and software for increasing the axial resolution, reducing background noise, and enhancing image features are discussed herein. In the following description, for purposes of explanation, numerous specific details are set forth in order to provide a thorough understanding of the present invention. It will be evident, however, to one skilled in the art that the present invention may be practiced without these specific details.

The various embodiments herein can provide methods capable of improving axial resolution and revelation features of acoustic images obtained from various types of ultrasound system. Additionally, embodiments of the present invention may provide methods having an efficient, effective, and excellent feature enhancement in acoustic signals and data processing. The embodiments can include novel and effective techniques and systems for post-processing A-scan signals. These novel techniques are more general and effective than conventional signal/image methods in terms of noise reduction and resolution enhancement for a wide range of acoustic signals including but not limited to speech, medical ultrasound, and NDT.

Background noise can have a significant impact on the cleanliness of ultrasonic signals. When signals from a target are much stronger than that of the background noise, it would be not crucial to remove the noise. However, when the ultrasonic signals from a target are at the noise level, the background noise makes a significant difference in interpretations of those target signals. For example, when inspecting the microstructure of a metal, the signals employed are backscattering (grain noises) from the metal. The backscattering can only be observed when the received signals are amplified more than 30 dB. In such an amplification, the background noise associated with the system is at the same or similar level as the backscattering signals. In other words, the software evaluating the acoustic signals is not able to differentiate the background noise and grain noises using conventional de-noising algorithms in the time domain or the frequency domain.

Accordingly, embodiments may provide methods for decreasing or reducing the duration (width) of the pulses scattered/reflected by multiple objects/scatters. Such embodiments can accomplish this by eliminating, or at least partially eliminating, the background noise by deconvolving the system responses (i.e., reference signals) obtained from either theoretical modeling or experimental acquiring. In one embodiment, the method minimizes the pulse duration by using a regression technique to predict the spectra responses outside a frequency band. Other embodiments may pick the amplitude of time-series signals up with a 3-6 dB drop so that the influence of pulse interference may be neglected. Still other embodiments of the present invention may decrease or reduce the impact of signal interferences due to a low-frequency limitation.

Embodiments of the present invention may eliminate, or at least reduce, this background noise by providing a frequency domain filter designed in terms of the reference signals. Another embodiment may provide a method including a beam correction. The beam correction may be performed prior to signal processing to remove or partially remove the influences from the transducer. The beam correction may be performed in the time domain or frequency domain.

Another illustrative embodiment may provide a method including a window function to extract the region of interest (ROI, a.k.a. ringing window) and a beam correction method. The window function may include an algorithm to align the signals spatially to avoid blurring of targets in the ROI. The operation of beam correction may be performed before or after the window extraction.

An additional embodiment may provide a method including a spectra exploration of the signals processed by beam correction and window extraction. The spectra extrapolation may be a nonlinear regressive, a linear regressive, or simply a bandpass filter. The extrapolation may operate once or several times and then take the average of the extrapolated spectra.

One embodiment may provide a method including a spectra exploration and Wiener transform of the signals processed by beam correction and window extraction. The Wiener transform may be performed before the spectra extrapolation but should be after the beam correction or window extraction.

Various embodiments may provide a method including Hilbert transform that is used in conjunction with a geometric mean filter. In these embodiments of the present invention, a geometric mean filter is performed after the Hilbert transform.

Other embodiments may provide a software package of beam correction, window extraction, spectra extrapolation, Wiener transform, Hilbert transform, and geometric mean filter. Another illustrative embodiment of the present invention may provide an algorithm in which beam correction, window extraction, spectra extrapolation, Wiener transform, Hilbert transform, and the geometric mean filter is implemented. In still other embodiments, a software package may consist of spectra extrapolation, Wiener transform, Hilbert transform, and geometric mean filter. In still other embodiments, an algorithm may consist of spectra extrapolation, Wiener transform, Hilbert transform, and geometric mean filter. In still other embodiments, a software package may consist of Hilbert transform and geometric mean filter for time series signals. In still other embodiments, an algorithm may consist of Hilbert transform and geometric mean filter for time series signals.

The embodiments may be well-suited to improve the resolution and to enhance the contrast of B-scan images, particularly images obtained from low-frequency transducers or receivers. Other embodiments may be used to improve the image quality of other ultrasound imaging modalities, such as Rayleigh wave imaging, Guided wave imaging, as well as other types of pulse-echo system.

Some embodiments may be an integrated method for various types of ultrasound systems such as, but not limited to, scanning acoustic microscopy, medical ultrasound imaging, sonography, nondestructive testing, laser-ultrasound, acoustic tomography, thermoacoustic imaging, and photoacoustic imaging. The embodiments may provide systems, software packages, or algorithms that can be implemented in existing signal processor and processing software such as, but not limited to, Matlab, Octave, and Python or integrated into embed Linux or UNIX systems.

Figure 1:
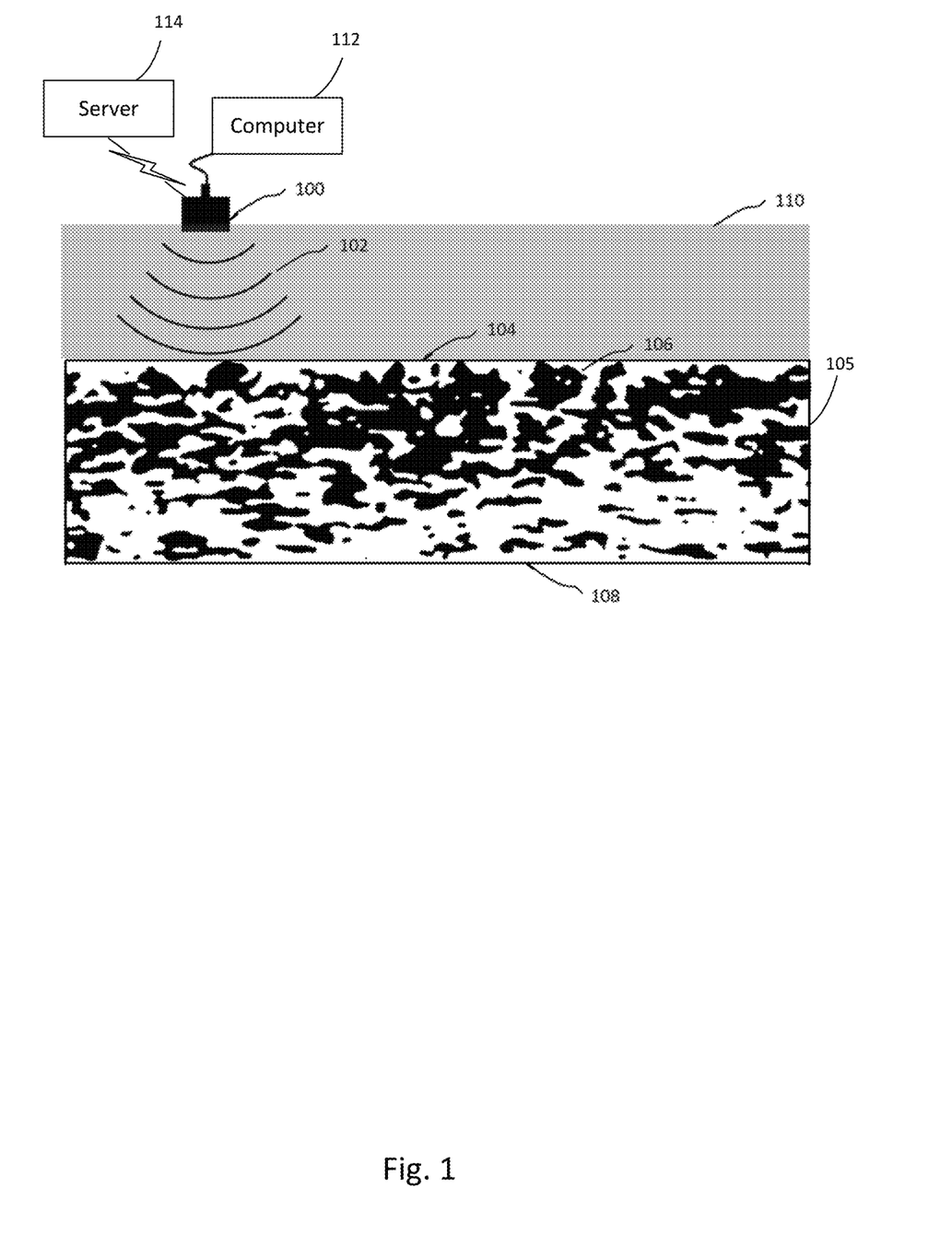
FIG. 1 illustrates a side view of one example of an exemplary acoustic transducer sending ultrasonic waves and impinging on a sample embedded with multiple closely-packed scatters of the embodiments.

FIG. 1 illustrates a side view of one example of an acoustic transducer sending ultrasonic waves and impinging on a sample embedded with multiple closely-packed scatters of the embodiments. In an ultrasonic inspection/evaluation/testing/imaging system of FIG. 1, an acoustic/ultrasonic transducer 100 can emit ultrasound 102 and receive the echoes reflected by a front wall 104, internal structure/scatters 106, and a back wall 108 of a sample 105. As used herein, the terms 'acoustic' and 'ultrasonic' may be used interchangeably, and the terms 'scattering' and 'reflection' of the ultrasonic waves from internal structures may be used interchangeably. An embodiment for the transducer 100 may be, but is not limited to, unfocused, spherical-focused, or line-focused transducers. Transducer 100 may also be, but is not limited to, wafer-type transducers for generating and receiving guided waves. An acoustic/ultrasonic wave 102 emitted by the transducer 100 may include planar, spherical, cylindrical, or guided waves. The internal structure 106 may include, but is not limited to, metal grains or grain clusters, pores, flaws, defects, or any other objects or materials that have different acoustic properties, such as density, elasticity, sound speed, against the host medium. The couplant medium 110 between the transducer 100 and the sample 105 may be a kind of fluid such as, but not limited to, water, air, alcohol, or glycerin.

In some embodiments, the transducer 100 may connect to, and/or operationally communicate with, a computer 112. In other embodiments, a communication device receiving signals from the transducer 100 may connect wirelessly to, and operationally communicate with, a server 114 through a wireless network, a broadband network, the Internet, or any appropriate network. In one embodiment, computer 112 or server 114 can operate to receive and analyze signals from transducer 100. In each exemplary instance, the computer 112 or server 114 may include but are not limited to a processor unit, memory storage device, and program code that can be accessed by a user. To save and analyze collected data, the computer 112 or server 114 may include a processor unit. The processor unit may be, for example, a central processing unit, a digital signal processor (DSP), a graphics processing unit (GPU), a plurality of processors, a multi-core processor, or some other suitable type of processing system. The storage device may include, for example, one or more memory storage devices such as but not limited to a random access memory, a hard disk drive, a solid state disk drive, a thumb drive, a memory stick, or some other suitable type of storage device. Program code can be stored on one or more storage devices in a functional form for execution by the processor unit. Program code can be executed by the processor unit to analyze signals received from the transducer 100.

Figure 2:
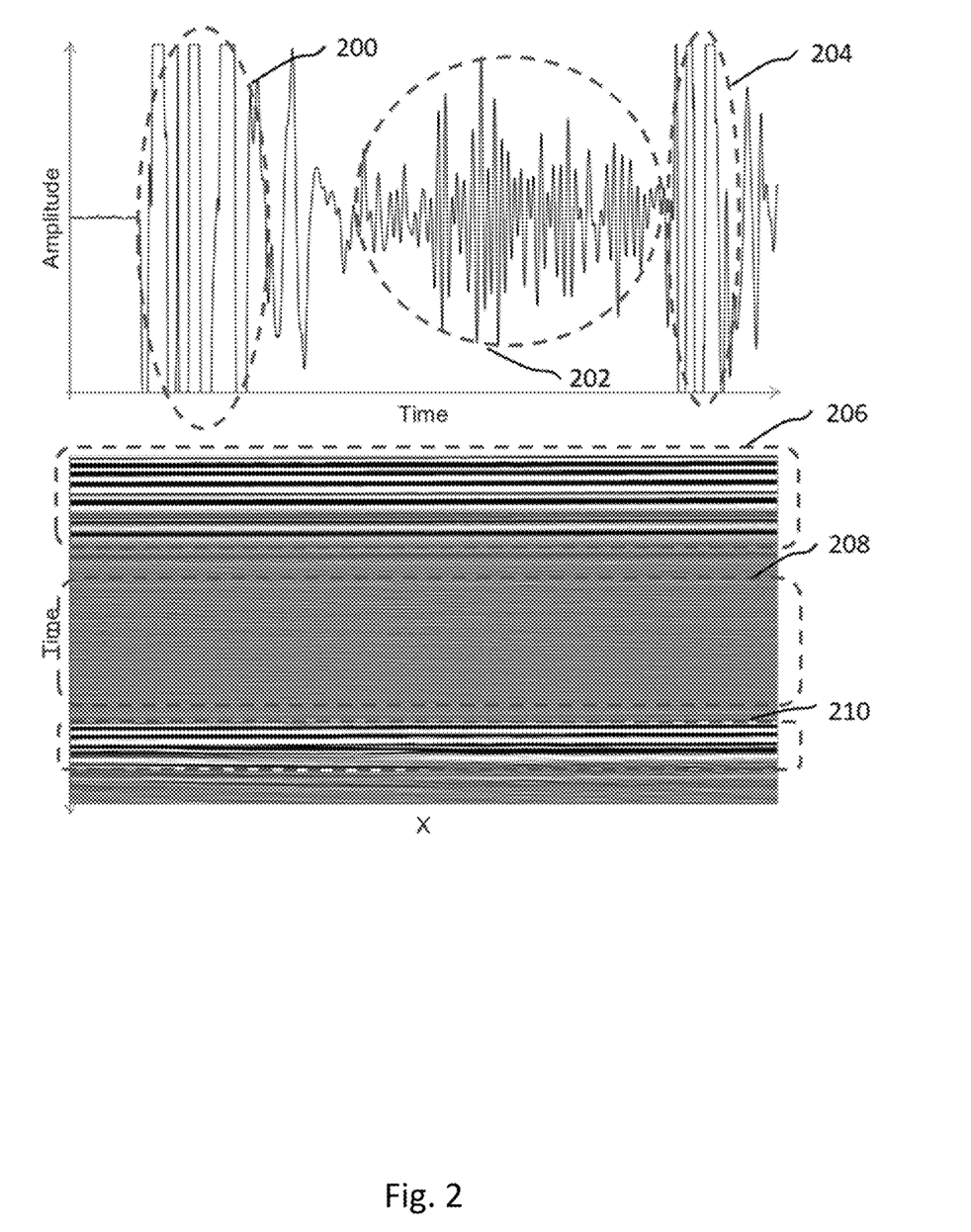
FIG. 2 illustrates an A-scan waveform in the time domain, and its reconstructed B-scan image corresponding to the signals collected from the ultrasonic configuration demonstrated in FIG. 1 of the embodiments.

FIG. 2 depicts an A-scan waveform in the time domain, and its reconstructed B-scan image corresponding to the signals collected from the ultrasonic configuration 102 demonstrated in FIG. 1. The reflection from the front wall 104 in FIG. 1 is shown as the saturated waveform 200. The backscattering from the internal structure 106 in FIG. 1 is shown as the scattering waveform 202. The reflection from the back wall 108 in FIG. 1 is shown as the saturated waveform 204. Various A-scan signals at different locations on the sample 105 are used to reconstruct the B-scan image 206 as shown below the waveform. B-scan image 206 is the imaging from the front wall 104 reflection 200. B-scan image 208 is the imaging from internal structure 106 backscatter 202. B-scan image 210 is the imaging of the back wall 108 reflection 204. When a diameter of a scatter is smaller than the wavelength of the ultrasound, and the distance between two neighbor scatters is smaller than the pulse duration (or pulse width) of the ultrasonic pulse, the scattering waveform is usually shown as waves 202, of which the interference exists. Additionally, the B-scan image 208 barely shows noticeable features about the internal structure 106. As a result, the B-scan imaging 208 that is reconstructed from the raw signals 202 does not reveal the internal structure 106.

Figure 3:
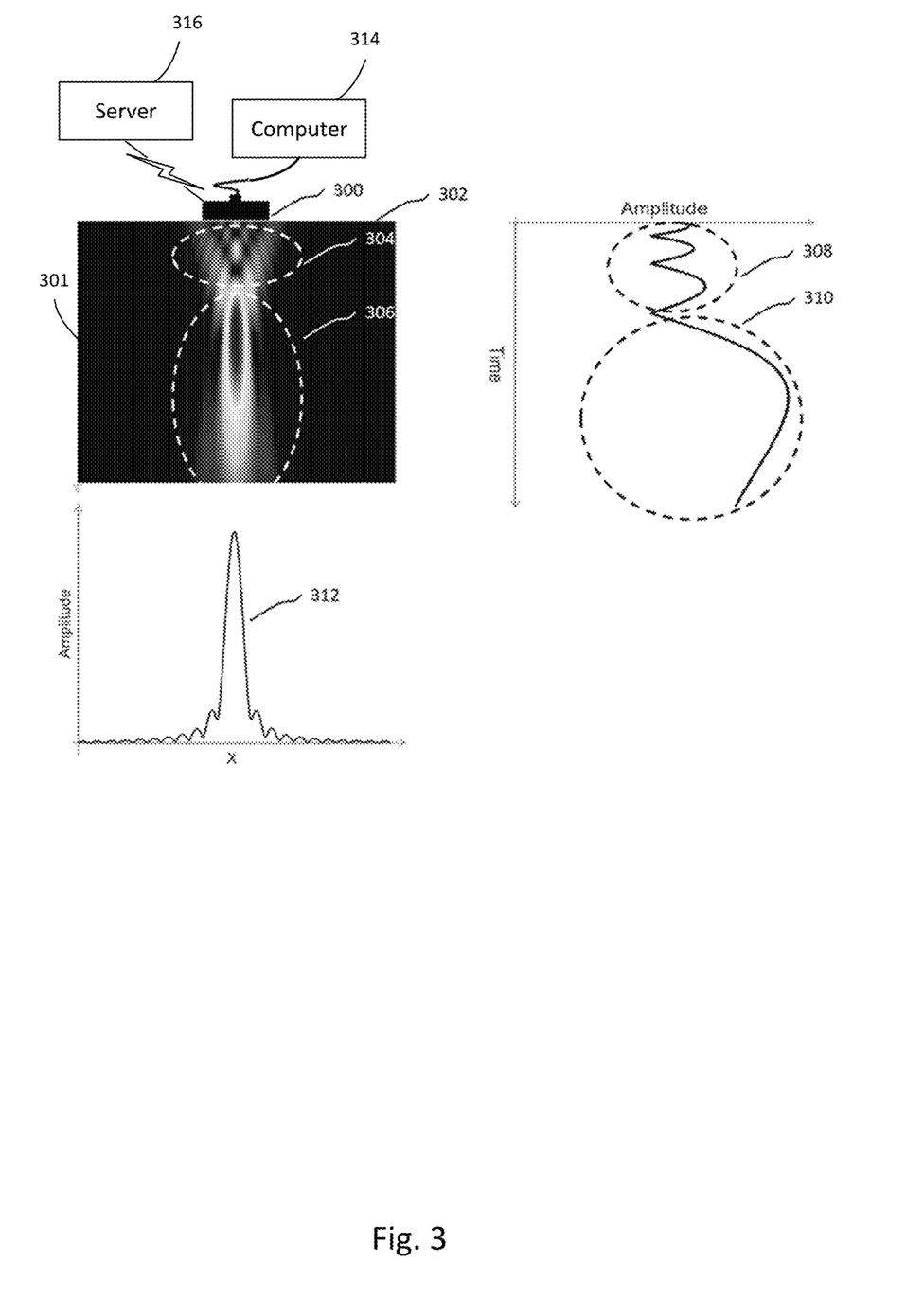
FIG. 3 illustrates a wave field inside a sample of the embodiments.

FIG. 3 illustrates a wave field inside a sample medium 301 of the embodiments. FIG. 3 depicts wave fields 304 and 306 in the medium 301 generated by a transducer 300. The transducer 300 may be the type of transducer 100 described in FIG. 1 whose signals are received by, and analyzed by, a computer 314 or server 316 that can be similar to computer 112 or server 114, respectively. The medium 301 includes a front surface 302, a near field or Fresnel zone 304 of the transducer 300 and a focused zone and/or far field 306 of the transducer 300. The acoustic pressure amplitude variation in the depth direction (with respect to time) is denoted by zone 308 and zone 310. Zone 308 is the on-axis amplitudes of near field 304, and zone 310 is the on-axis amplitude of far field 306. The amplitude variation in the horizontal direction (with respect to X) of far field 306 is shown by graph 312, of which the 6-dB drop of the width is called the beam diameter of transducer. This wave field may be obtained experimentally using a needle hydrophone or obtained using numerical simulations.

When the wave field is simulated, the following equations can be used for the calculations:

$$U_I(x, z, \omega) = -\frac{\rho_f c_f}{\rho_0 c_L} T_{fs} \exp\left[i\omega\left(\frac{z_f}{c_f} + \frac{z}{c_L}\right)\right] C_T$$

where $U_I$ is an amplitude of the wave field in the sample, $\rho_f$ is a density of the fluid, $z_f$ is a water path, $c_f$ is sound speed in water, $c_L$ is sound speed in the sample, $T_{fs}$ is the transmission coefficient from fluid to solid. $C_T$ is the diffraction correction for the transmitter. These parameters are in the form of $$T_{fs} = \frac{2\rho_f c_f}{\rho_f c_f + \rho_0 c_L}$$

$$T_{sf} = \frac{2\rho_0 c_L}{\rho_f c_f + \rho_0 c_L}$$

On-axis approximation is used to calculate the variation of amplitude along the z-direction. In order to obtain a clear image of the host medium 301, the wave profile of the transducer $U_I$ should be removed.

Figure 4:
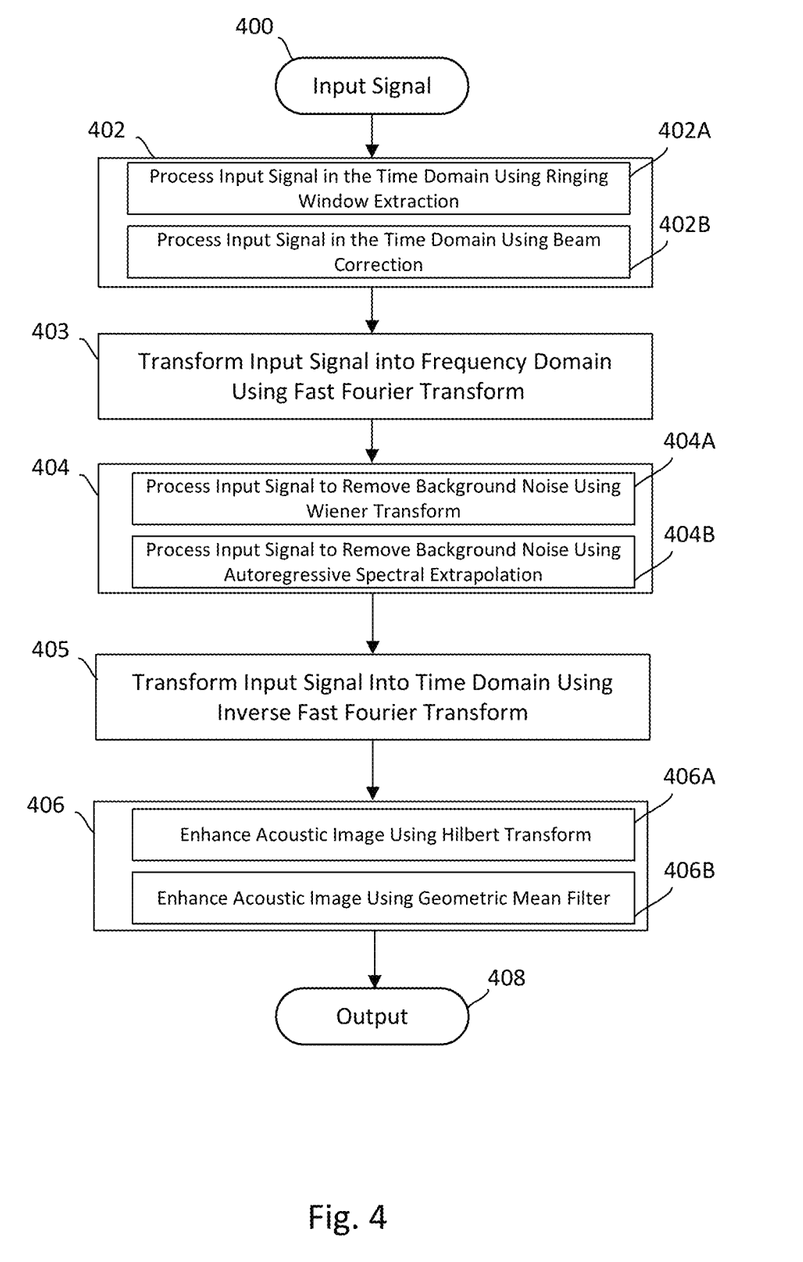
FIG. 4 illustrates a flowchart of an embodiment for acoustic signal processing.

FIG. 4 illustrates a flowchart of an embodiment for acoustic signal processing. More specifically, the flowchart in FIG. 4 shows an embodiment for a method or algorithm for revealing an improved image of an internal structure of a sample by a set of signal processing algorithms. In one embodiment, the method can reveal an improved image of internal structure 106 in FIG. 1 by a set of signal processing algorithms in program code in computer 112 or server 114. At step 400, an input signal may be the waveform shown in FIG. 2. At step 402, the input signal 400 can be processed in the time domain. Processing input signal in the time domain can include processing the input signal using ringing window extraction 402A and/or processing the input signal using beam correction 402B. An embodiment of a method for extracting the ringing window 202 in FIG. 2 can be briefly described as follows: a) align the time domain signals using a gating number equal to one-fifth to two-thirds of the front wall amplitude, b) determine the scattering window length by the formula t=2z/c, where z is the thickness of the sample, and c is the mean sound speed in the sample, and c) determine a pulse duration of the signal using the front wall reflection 200. Therefore, the ringing window equals the scattering window minus the front wall windows, as shown by 202 in FIG. 2. After the ringing window is extracted, a beam correction algorithm can be applied to the windowed signal, which is calculated by the following equations after transformed in the time domain $$p(\omega) = U_I(\omega) A(\omega) P_o(\omega)$$

$$P_o(\omega) = i\omega\rho_0 c_L T_{sf} \exp\left[i\omega\left(\frac{z_f}{c_f} + \frac{z}{c_L}\right)\right] C_R$$

where p is the acquired signal, A is the scattering signal, $T_{sf}$ is the transmission coefficient from solid to fluid, and $C_R$ is the diffraction correction for the receiver which is in the form of:

$$C_R = \frac{2}{-i\frac{\omega}{c_L}a^2} C_T$$

After the input signal 400 is processed in the time domain by module 402, at step 403 the method can include the input signal 400 being transformed into the frequency domain by a fast Fourier transform (FFT) algorithm. At step 404, the method can process the input signal 400 to remove background noise using a two-step process. First, a Wiener transform 404A can be used to remove or partially remove the background noise by assuming that signals measured by the transducer 100 can include the contributions from the target objects, measurement system, noises, and propagation paths taken by ultrasonic waves. Therefore, a record ultrasonic signal y(t) can be written as y(t)=h(t)*x(t)+n(t). Here h(t) is the system impulse response, * is the convolution operator, x(t) is the specimen response, and n(t) is the noise. In the frequency domain, it can be written as:

$$Y(\omega) = H(\omega)X(\omega) + N(\omega)$$

where the capitalized letters are the corresponding variables in the frequency domain. A Wiener filter is formulated based on the minimization of a least square error. In the frequency domain, the Wiener filter can be written as:

$$X(\omega) = \frac{Y(\omega) H^*(\omega)}{|H(\omega)|^2 + Q^2}$$

where $H^*(\omega)$ is the complex conjugate of $H(\omega)$ is the "noise desensitizing factor", which is in the form of:

$$Q^2 = 0.01 |H(\omega)|_{max}^2$$

Theoretically, the deconvolved signal is due to the material responses. In one embodiment, after the Wiener transform 404A, the deconvolved signal $X(\omega)$ can be further improved by using autoregressive (AR) spectral extrapolation 404B. In the embodiment, the AR spectral extrapolation 404B can be part of the deconvolved spectrum with high signal to noise ratio (SNR) and could be modeled as an AR process. In other words, the remaining parts of the signal can be then extrapolated based on the region of high SNR. The exemplary method can generate a broadband spectrum from a narrowband signal, (i.e., the part of the signal which has high SNR), which in turn produces shorter pulses in the time domain. The signal in the frequency domain can be represented as the sum of a small number of complex exponentials by using the maximum-entropy algorithm of Burg. Any data point in the deconvolved frequency spectrum is a linear function of the k points preceding or following it. Here, the integer k is defined as the order of the AR model. By minimizing the forward and backward prediction errors while satisfying the Levinson-Durbin recursion, the Burg method for AR spectral estimation gives out the AR coefficients that are used to estimate signals in the region of low SNR. A window of the frequency spectrum that has a high SNR and covers between the points with indices m and n is selected. The AR model can then be applied to this selected window, and AR coefficients are estimated by applying the Burg method. The backwards (1 to m) and forwards (n to Nyquist frequency, N) regions of the frequency spectrum are extrapolated using the following weighed sums:

$$\overline{X}_p = -\sum_{i=1}^{k} a_i^* X_{p+1}, \quad p = 1, 2, \ldots, m-1$$

$$\overline{X}_q = -\sum_{i=1}^{k} a_i X_{q-i}, \quad q = N = 1, \ldots, N$$

where $\overline{X}$ is the predicted values and a, and are the AR coefficients and the corresponding complex conjugates, respectively. Several windows in the frequency domain in terms of 1-10 dB drops can be selected, and hence an averaged extrapolation can be obtained. An alternative embodiment for an adaptive extrapolation method can include choosing the frequency window according to the SNR in each ringing window.

At step 405, the method can include the processed input signal being transformed back into the time domain using inverse fast Fourier transform (iFFT) algorithms, of which the peaks are important in the image reconstruction.

At step 406, the method can further include enhancing a feature of an acoustic image that includes steps 406A and 406B. To obtain the peaks of the time-series signals, algorithms for detecting the envelopes can be implemented. For example, in one embodiment, a Hilbert transform 406A can be employed for demonstration as the following:

$$\hat{x}(t) = \frac{1}{\pi} \int_{-\infty}^{+\infty} \overline{x}(\tau) \frac{1}{t-\tau} d\tau$$

where $\overline{x}$ is the time domain signals transformed from $\overline{X}$. Mathematically, the Hilbert transform is an equivalent to a special kind of a linear filter, in which all the amplitudes of the spectral components are kept unchanged while their phases are shifted by $-\pi/2$. Therefore, the envelope or instantaneous amplitudes can be obtained using the following equation:

$$A(t) = \pm \sqrt{\hat{x}(t)^2 \alpha \overline{x}(t)^2}$$

where the plus sign of the root square corresponds to the upper positive envelope, and the minus sign corresponds to the lower negative envelope.

At step 406B, the method can include processing the output data of 406A using a geometric mean filter as a nonlinear image filtering process to remove Gaussian noise. The geometric mean filter can operate by replacing each pixel by the geometric mean of the values in its neighborhood that can be calculated by the following equation:

$$G(\hat{x}) = \left( \prod_{i \in (\hat{x})} \hat{x}_i \hat{x}_{i+n} \right)^{1/n}$$

Here, n is the number of the time series to be processed. For the embodiments, the geometric mean is more appropriate than the arithmetic mean to enhance the grain boundaries because of the size of the scatters. After the input signal 400 goes through step 402 to 406A and 406B, at step 408 it is ready for image reconstruction.

Figure 5:
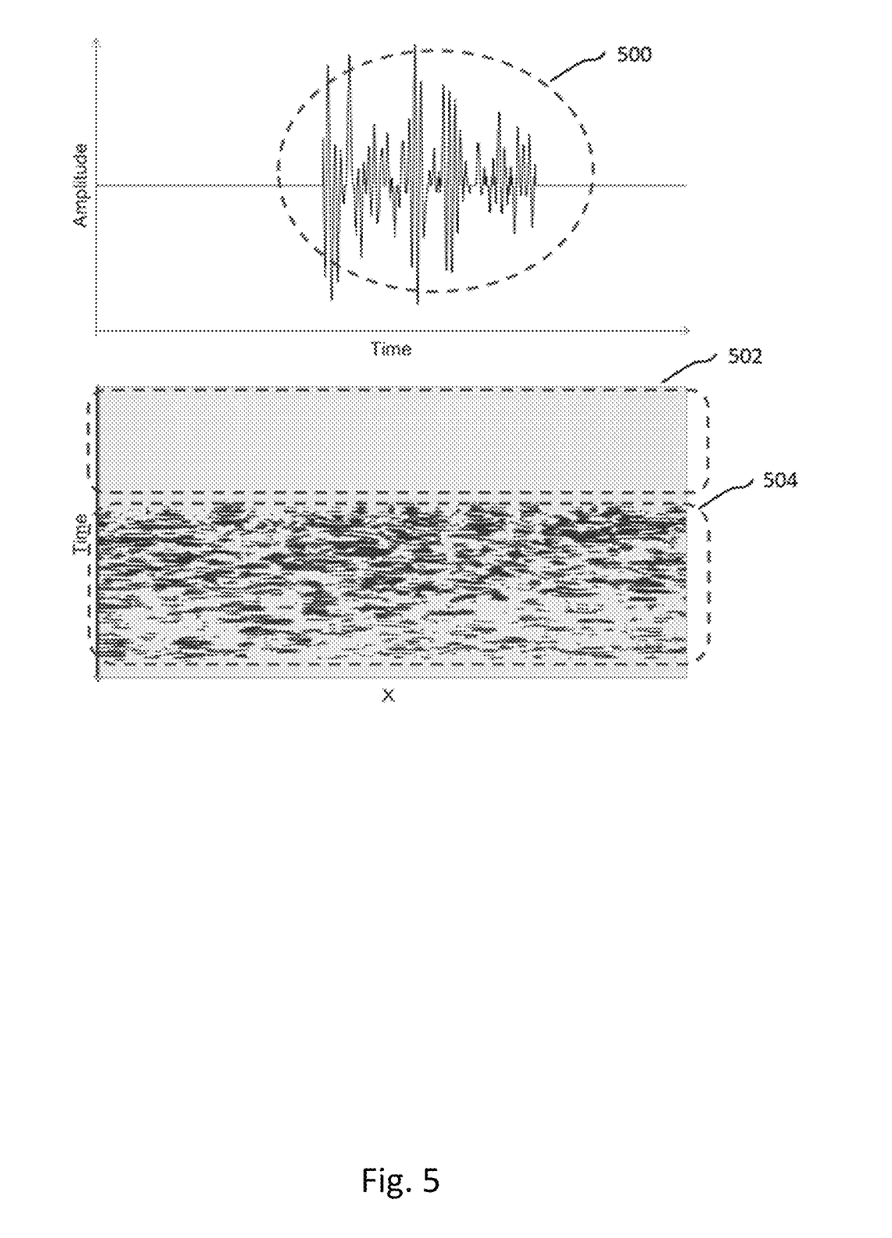
FIG. 5 illustrates an exemplary processed A-scan signal and the corresponding reconstructed B-scan image of the embodiments.

FIG. 5 depicts an embodiment for a processed A-scan waveform 500 in the time domain, and its reconstructed B-scan image corresponding to the signals collected from the ultrasonic configuration demonstrated in FIG. 1. The reflections from the front wall 104 and back wall 108 in FIG. 1 are removed by window extraction. The part of backscattering from the internal structure 106 in FIG. 1 is shown by waveform 500. Image 502 is imaging from the front wall reflection however removed. The B-scan image 504 is the imaging of the backscattering signals from waveform 500. FIG. 5 clearly shows that the B-scan image 504 displays the patterns closely resembling the internal structure 106 in FIG. 1. As a result, the imaging 504 that is reconstructed from the processed signal 500 effectively reveals the hidden features that are not able to observe from the raw signal imaging 208.

Figure 6:
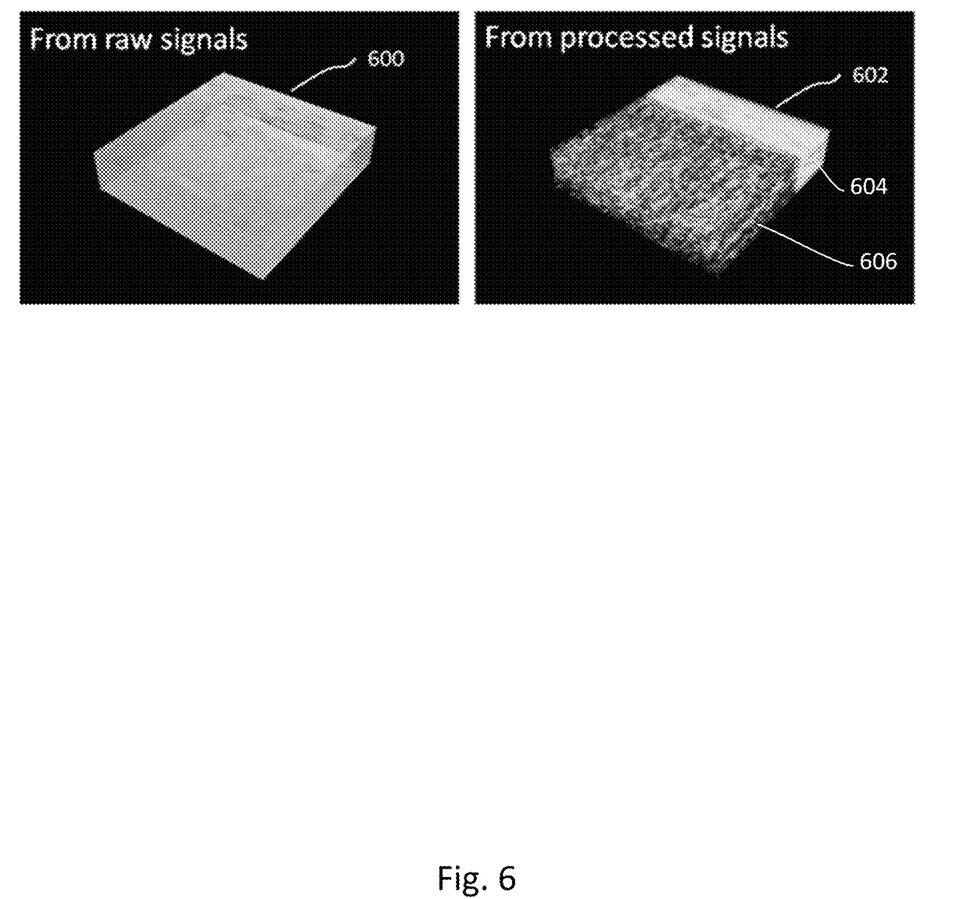
FIG. 6 illustrates 3D images reconstructed by raw and processed signals of the embodiments.

FIG. 6 illustrates 3D images reconstructed by raw and processed signals of the embodiments. In one embodiment, a volumetric rendering 600 can be constructed from the raw data corresponding to waveform 202 in FIG. 2. It is difficult to obtain any meaningful features of the internal structure 106 from this 3D image. In an embodiment, a volumetric rendering 602 can be constructed from the processed data corresponding to waveform 500 in FIG. 5. Volumetric rendering 602 displays two distinct parts 604 and 606, of which part 606 exhibits fiber-like patterns. These patterns closely resemble the real internal structure 106 of the metallic sample 105 imaged by other methods such as EBSD and chemical etching.

Various embodiments of the present invention may incorporate one or more of these and the other features described herein. The following detailed description taken in conjunction with the accompanying drawings may provide a better understanding of the nature and advantages of the present invention. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. While the invention has been described with a certain degree of particularity, it is manifest that many changes may be made in detail of construction and the arrangement of components without departing from the spirit and scope of this disclosure. The present disclosure is to be considered as an exemplification of the principles of the invention and is not intended to limit the invention to the specific embodiments illustrated herein by the figures or description above.

What is claimed is:

1. A method for processing acoustic signals from an ultrasonic imaging system, comprising:
  receiving input signal data comprising acoustic data from a scanning device;
  processing the input signal data in a time domain using ringing window extraction;
  processing the ringing-window-extraction-processed input signal data in the time domain using beam correction;
  transforming the beam-correction-processed input signal data into a frequency domain using Fast Fourier transforms;
  removing background noise from the transformed frequency-domain input signal data;
  transforming the background-noise-removed, frequency-domain input signal data into a time domain using inverse Fast Fourier transforms;
  converting the inverse-Fast-Fourier-transformed input signal data into an acoustic image; and
  enhancing the acoustic image using Hilbert transforms.

2. The method for processing acoustic signals of claim 1, wherein the removing background noise from the transformed frequency-domain input signal data comprises processing the transformed frequency-domain input signal data using Wiener transforms.

3. The method for processing acoustic signals of claim 2, wherein the removing background noise from the transformed frequency-domain input signal data using Wiener transforms comprises processing the Wiener-transformed input signal data using autoregressive spectral extrapolation.

4. A method for processing acoustic signals from an ultrasonic imaging system, comprising:
  receiving input signal data comprising acoustic data from a scanning device;
  processing the input signal data in a time domain;
  processing the ringing-window-extraction-processed input signal data in the time domain;
  transforming the beam-correction-processed input signal data into a frequency domain;
  removing background noise from the transformed frequency-domain input signal data;
  transforming the background-noise-removed, frequency-domain input signal data into a time domain;
  converting the background-noise-removed, frequency-domain transformed input signal data into an acoustic image; and
  enhancing the acoustic image.

5. The method for processing acoustic signals of claim 1, wherein the removing background noise from the transformed frequency-domain input signal data comprises processing the transformed frequency-domain input signal data using Wiener transforms.

6. The method for processing acoustic signals of claim 2, wherein the removing background noise from the transformed frequency-domain input signal data using Wiener transforms comprises processing the Wiener-transformed input signal data using autoregressive spectral extrapolation.

* * * * *